United States Patent [19]
Wiley, Jr. et al.

[11] Patent Number: 5,174,626
[45] Date of Patent: Dec. 29, 1992

[54] ROOFTOP DRAG REDUCING DEVICE

[75] Inventors: Nathaniel C. Wiley, Jr., Weston; John R. Boath, Huntington, both of Conn.

[73] Assignee: Airshield Corporation, Bridgeport, Conn.

[21] Appl. No.: 888,261

[22] Filed: May 22, 1992

Related U.S. Application Data

[63] Continuation of Ser. No. 686,601, Apr. 17, 1991, abandoned.

[51] Int. Cl.$^5$ .............................................. B62D 35/00
[52] U.S. Cl. .............................. 296/180.1; 296/180.2; 296/180.3; 296/180.5
[58] Field of Search ............... 296/180.1, 180.2, 180.3, 296/180.5

[56] References Cited

U.S. PATENT DOCUMENTS

| | | | |
|---|---|---|---|
| 3,822,910 | 7/1974 | Wiley, Jr. | 296/180.3 |
| 4,749,220 | 6/1988 | Adams et al. | 296/180.3 |
| 4,784,424 | 11/1988 | Wiley, Jr. | 296/180.2 |

FOREIGN PATENT DOCUMENTS

| | | | |
|---|---|---|---|
| 0494564 | 7/1977 | Australia | 296/180.3 |
| 3619958 | 12/1987 | Fed. Rep. of Germany | 296/180.3 |
| 2136362 | 9/1984 | United Kingdom | 296/180.3 |
| 2221430 | 2/1990 | United Kingdom | 296/180.2 |

*Primary Examiner*—Dennis H. Pedder
*Attorney, Agent, or Firm*—Mark P. Stone

[57] ABSTRACT

A roof top drag reducing device includes a lower base portion mounted to or formed integrally with the roof of a truck for semi-trailers. An upper portion of the drag reducing device is selectively movably mounted relative to the lower base portion between a first elevated operative position atop the lower base and a second non-operative retracted position generally forward of and below the lower base portion. The top portion of the drag reducing device will be in its elevated operative position when a trailer is attached to the truck and reduction of air resistance over the trailer is desired. The top portion of the drag reducing device will be in its forward non-operative position, when, for example, several cabs are being towed and transported together from one location to another. If the lower base portion is formed integrally with the roof of the truck, the lower base portion can form the ceiling of a sleeper compartment or area of the truck to significantly increase the height of the sleeper area.

20 Claims, 4 Drawing Sheets

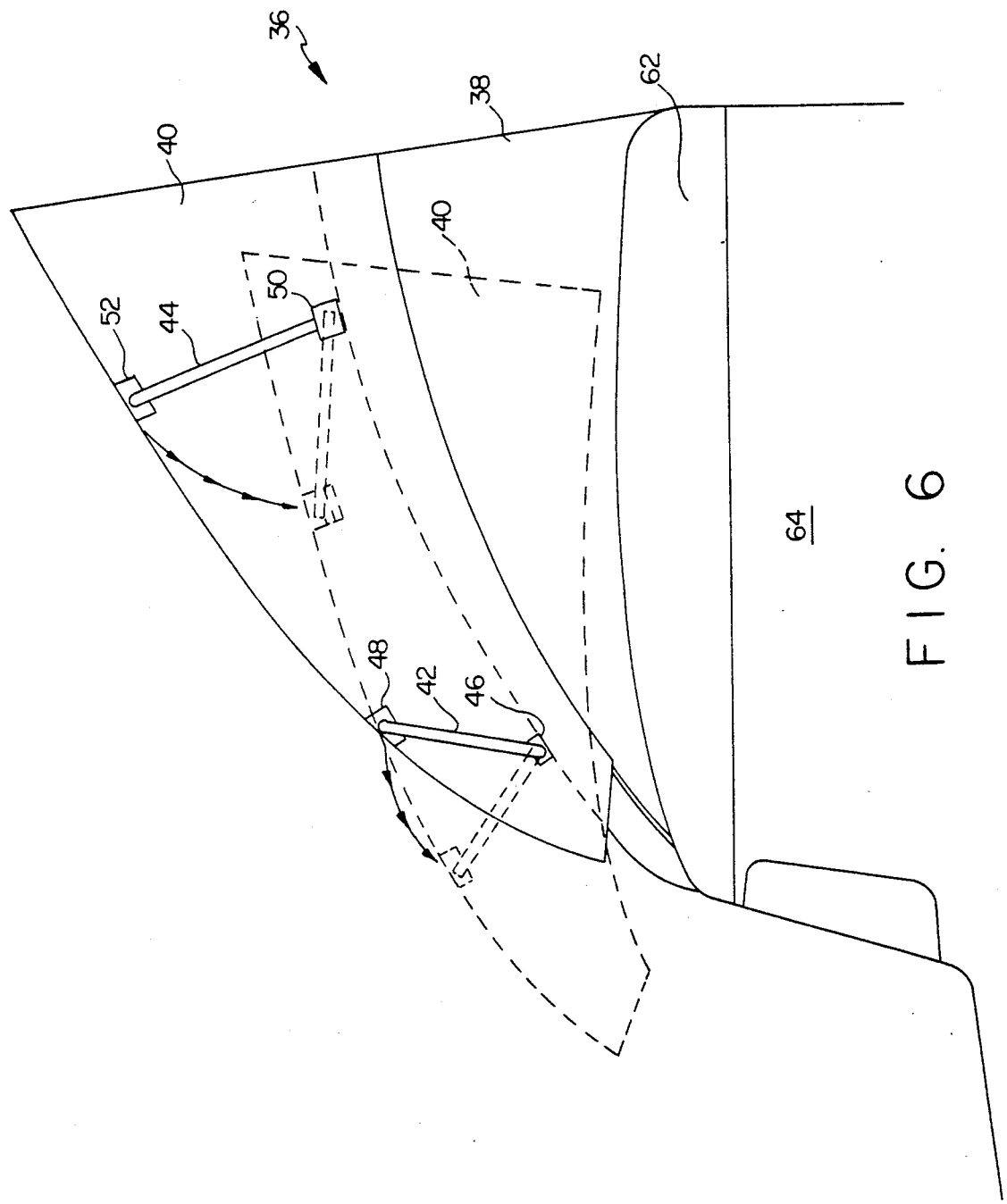

ROOFTOP DRAG REDUCING DEVICE

This application is a continuation of application Ser. No. 07/686,601 filed Apr. 17, 1991, now abandoned.

BACKGROUND OF THE INVENTION

The present invention relates to roof top drag reducing devices for land vehicles, particularly tractor-trailer trucks. The invention more specifically relates to adjustable drag reducing fairings mounted to the roofs of trucks which drive trailers to facilitate multi-shipments of trucks alone after the drag reducing fairings have been mounted to the truck roofs.

Roof top drag reducing devices including air fairings have come into widespread use on trucks, particularly on cabs pulling semi-trailers. These drag reducing devices direct the air passing over the top of the truck in such a way that the resistance of wind hitting the flat front portion of the trailer being pulled by the cab is minimized. Among other things, the drag reducing devices save fuel costs for the trucker. A fuller explanation and description of the general nature of drag reduction fairings and the advantages thereof may be found by reference to U.S. Pat. No. 4,245,862 issued on Jan. 20, 1981, the disclosure of which is expressly incorporated by reference herein.

U.S. Pat. Nos. 4,784,424 and 4,919,472, the disclosures of each of these patents being expressly incorporated by reference herein, describe a two-piece air resistance reduction fairing mounted to the roof of a truck to which a trailer is removably mountable. The air reduction device described in these two patents includes a lower, generally open base portion fixedly mounted to the roof of the cab, and an upper portion movably mounted relative to the fixed lower portion. The upper portion is selectively receivable within the fixedly mounted lower base portion in a first non-operational storage position, and is selectively movable into a position atop the fixed lower base portion in a second raised operational position. The upper fairing portion will be in its raised operational position when the truck is pulling a trailer and reduction of air resistance is desired. The upper fairing portion will be in its lowered storage position received within the fixed upper portion when reduction of air resistance is unnecessary, as for example, during multi-shipments of several trucks having the drag reducing devices mounted on the roofs thereof.

As more fully discussed in the aforementioned U.S. Pat. Nos. 4,919,472 and 4,784,424, the adjustable fairing reduces the maximum elevation of the trucks during multi-shipments to enable a plurality of such trucks to be shipped and transported in one operation by permitting towed or "piggy backed" trucks to fit under bridges and other overhead highway structures. In this manner, the drag reduction devices may be fully installed on the trucks by the truck manufacturer, the fairings and the trucks can be painted simultaneously, and thereafter delivered to a dealer in a substantially operational condition. This procedure reduces the overall costs and labor of installation and delivery of trucks with drag reduction devices mounted thereon. As also discussed in the aforementioned patents, a height adjustable air resistance reduction fairing advantageously permits conventional towing of a truck having a fairing installed thereon without requiring the removal of the fairing, but instead, by merely moving the top fairing portion into its lower non-operational position received within the lower opened base fairing portion fixedly mounted to the truck roof.

The aforementioned patents do not enable use of the base portion of the fairing as the roof of a sleeper compartment or sleeper space since the upper fairing section folds into the base and the base must be an opened structure.

U.S. Pat. No. 4,775,179 issued Oct. 4, 1988, discloses a cab of a tractor-trailer truck carrying a sleeper compartment having an elevated roof configured as a fairing. The fairing and the roof are joined together and the fairing itself thus comprises a single, non-adjustable piece. The height of the fairing remains constant, and the fairing may only be removed from the cab by completely removing the roof of the sleeper compartment or the entire sleeper compartment.

It is the primary object of the present invention to provide an improved drag reduction fairing of the type carried on the roof of a tractor-trailer truck, and being selectively adjustable between operational and non-operational positions. It is a further object of the present invention to provide an improved adjustable roof fairing of the aforementioned type in combination with a sleeper compartment also carried by or comprising part of the truck. Further objects and advantages of the present improvement will become apparent from the following description.

SUMMARY OF THE INVENTION

The improvement of the present invention comprises an adjustable air resistance drag reduction fairing adapted to be mounted on, or formed integrally with, a roof of a truck for pulling a removable trailer. The drag reduction fairing includes a lower base portion having a closed top and being fixedly positioned relative to the roof of a truck. Alternatively, the lower base portion may be integrally formed with the roof of the truck. An upper fairing portion is movably mounted relative to the lower base portion, and is selectively movable in a generally longitudinal direction between a first elevated operational position in which the top portion is mounted atop the lower base portion, and a second retracted non-operational position in which the top portion is moved generally forward and below the fixed base portion. The fairing will be moved into its elevated operational position when the truck is pulling a trailer and drag reduction is desired. The fairing will be moved into its lower non-operational position when no drag reduction is required and reduced height is necessary, such as when more than one truck without a trailer is being towed or transported in "piggy back" fashion.

If the truck carries a separate sleeper compartment or the cab and sleeper compartment are provided as a common space, the fixed lower base portion of the fairing may be integrally formed together with the roof of the sleeper compartment or section. In this manner, the sleeper compartment or section and the base portion of the fairing can be manufactured together resulting in reduced labor and costs which would otherwise be incurred from separate manufacture and mounting, and the resulting sleeper compartment or section will be formed with an elevated roof portion to significantly increase the comfort and convenience of the occupant. When the lower base portion of the fairing is not formed integrally with the roof of a sleeper compartment, the base portion is mounted to the roof of the truck by conventional means.

The upper and lower fairing portions may be formed from any suitable material, as for example, fiberglass. The fairing portions may also be manufactured by conventional processes, as for example, injection molding. The upper fairing portion can be manufactured to include a top trim tab which may be adjustable, and side trim tabs which may also be adjustable can be provided on the sides of the fairing to reduce the resistance of air flowing around the sides of a trailer attached to the truck.

BRIEF DESCRIPTION OF THE DRAWINGS

FIG. 6 of the drawing illustrates a side elevational view of a two-piece fairing in accordance with the present invention in which the fixed lower base fairing portion is mounted directly atop the cab of a vehicle.

DESCRIPTION OF THE BEST MODES FOR CARRYING OUT THE INVENTION

Figure 1:
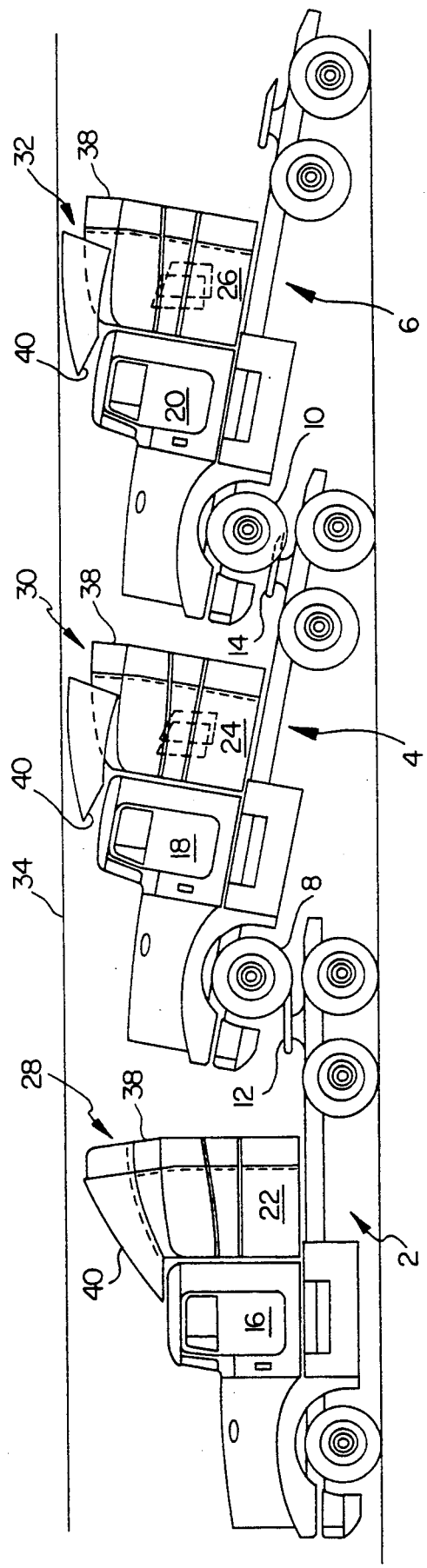
FIG. 1 of the drawing illustrates adjustable fairings mounted to the roofs of trucks being transported together in "piggy back" fashion, in accordance with the present invention.

Referring to FIG. 1 of the drawing, trucks or semi-trailers are illustrated as being shipped from a factory in multiples, such as the three trucks illustrated by reference numerals 2, 4, and 6. The front wheels 8 and 10 of the trucks 4 and 6, respectively, are mounted to the fifth wheels 12 and 14, respectively, of the next forward trucks 2 and 4. The trucks 4 and 6 are towed by the forward-most truck 2.

Each of the trucks 2, 4 and 6 include a cab portion 16, 18 and 20, respectively, for accommodating a driver when the trucks are driven. The trucks also include sleeper compartments 22, 24 and 26 located directly behind the respective cab compartments of each truck.

Each of the trucks, 2, 4 and 6 also include an air resistance drag reduction device designated respectively as reference numerals 28, 30 and 32. The drag reduction devices, also referred to as air fairings, are mounted atop the roof portions of the respective cab and sleeper compartments which are both at a common elevation and height. The fairings on trucks 4 and 6 are shown in a depressed or retracted non-operational position so that the maximum elevation of the towed trucks 4 and 6 does not exceed a predetermined height (as shown by broken line 34), which may represent the elevation of a bridge or other overhead structure under which the towed trucks must be driven. In the retracted non-operational position of the fairings, an upper fairing section 40 is moved forwardly and downwardly relative to a fixed lower base fairing section 38.

Figure 2:
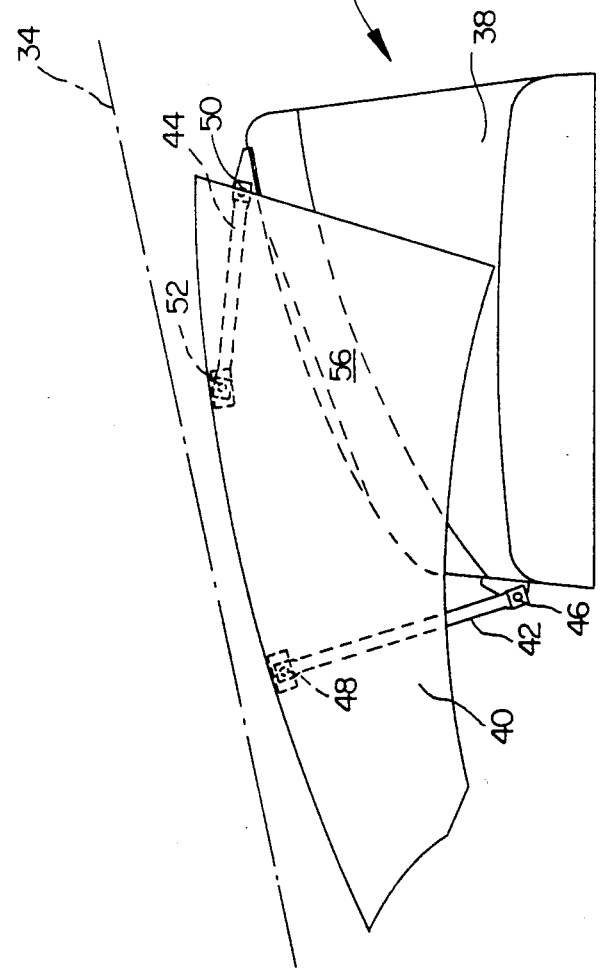
FIG. 2 of the drawing illustrates, in section, an adjustable two-piece roof fairing in accordance with the present invention in which a top fairing portion is shown in a retracted non-operational position relative to a fixed lower base fairing portion.

FIG. 2 of the drawing illustrates the preferred embodiment of an adjustable drag reduction device for land vehicles in accordance with the present invention. The drag reduction device comprises a fairing designated generally by the reference numeral 36. The fairing 36 includes a lower base fairing portion 38 and an upper or top fairing portion 40. The lower base portion 38 can be mounted directly to the roof of a sleeper compartment of a truck, such as that illustrated by reference numerals 22, 24, or 26 of FIG. 1, or in the alternative, the lower base fairing portion may be formed integrally with the roof of a sleeper compartment. When the truck on which the fairing is mounted does not include a sleeper compartment, the lower base portion 38 of the fairing will be mounted directly to the roof of the cabs 16, 18 or 20 of the trucks 2, 4, and 6, respectively. In any event, the lower base fairing portion 38 is fixedly positioned relative to the roof of a truck.

A forward strut 42 and a rear strut 44 connect the lower base fairing portion 38 to the upper fairing portion 40 so that the upper portion 40 is pivotably movable relative to the base portion 38. More specifically, the forward strut 42 is pivotably mounted at one end to the forward end of the base 38 at a mounting location 46, while the opposed end of strut 42 is pivotably mounted at a mounting location 48 to the inner surface of the top of the upper fairing portion 40 proximate to its front end. In a similar manner, the rear strut 44 is pivotably mounted at one end to a mounting location 50 proximate to the rear portion of the top surface of the base fairing portion 38, while the opposed end of rear end strut 44 is pivotably mounted to the inner surface of the top of the upper fairing portion at a mounting position designated by the reference numeral 52 proximate to its rear end. The rear mounting location 52 is rearwardly oriented relative to the forward mounting location 48 so that the upper fairing portion 40 may be selectively moved forwardly and downwardly relative to the fixed base fairing portion 38. The upper fairing portion 40 is in its retracted, lower non-operational position as illustrated in FIG. 2. The top surface of the upper fairing portion is below the predetermined height line designated by the reference numeral 34 when the fairing is in its non-operational position.

Figure 3:
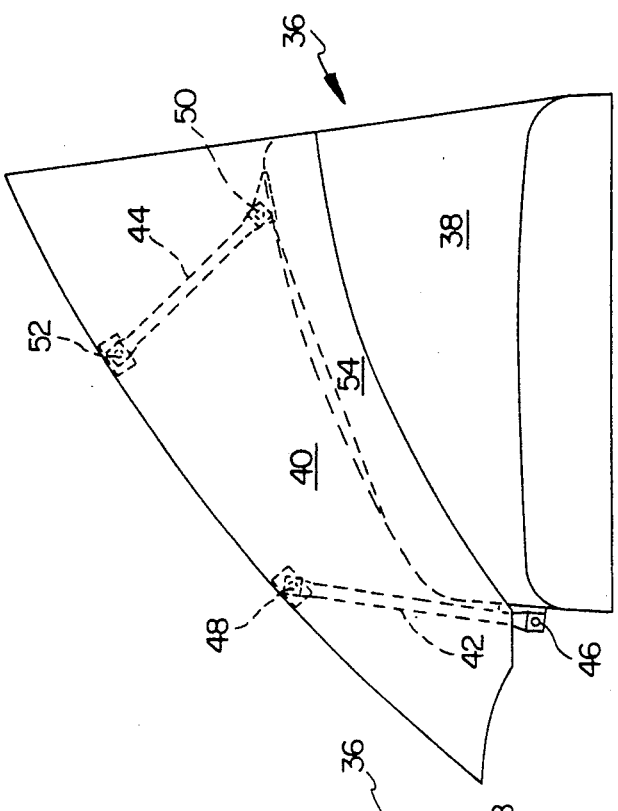
FIG. 3 of the drawing illustrates, in section, the two-piece roof fairing of FIG. 2 shown in an operational position in which the top fairing portion is mounted above the fixed lower base fairing portion.

FIG. 3 of the drawing illustrates the drag reducing fairing 36 shown in FIG. 2 which is now in its elevated, operational position. By comparing FIG. 2 with FIG. 3, it is evident that the upper fairing portion 40 as shown in FIG. 2 has been moved rearwardly and upwardly relative to the fixed base fairing portion 38 via the pivotable struts 42 and 44. The forward pivotable strut 42 is now substantially parallel to the orientation of the front surface of the fixed lower base fairing portion 38. In its elevated operational position, the upper fairing position is supported substantially atop the fixed lower base. As is evident from FIGS. 3–5 of the drawing, when the upper fairing portion 40 is in its elevated operational position, the rear end of the upper portion is substantially in alignment with the rear end of the fixed base portion to define a substantially continuous rear end of the overall fairing 36. The rear end wall of the fixed lower fairing base 38 may be either opened or closed, while the rear end wall of the upper fairing portion 40 must be opened to permit movement of the upper portion relative to the fixed base. The upper fairing portion 40, as illustrated in FIGS. 3-5, is greater in length than the fixed base fairing portion 38 such that the forward end of the upper fairing portion extends beyond the forward end of the fixed base portion when the fairing is in its elevated, operational position as illustrated in FIG. 3 of the drawing.

In the elevated, operational position of the fairing shown in FIG. 3, a portion of the bottom of the upper fairing section 40 overlaps with a portion of the top of the lower base fairing section 38, and this area of overlap is designated by reference numeral 54. Openings (not shown in the drawing) may be provided in the upper and lower fairing portions 40 and 38 in the intersection area 54 so that the respective fairing sections can be removably secured to each other by conventional means (such as bolts) when the fairing is in its elevated operational position. In a similar matter, the same or different openings may be provided in the area of intersection 56 between the upper and lower fairing portions when the fairing is in its retracted non-operational position, as illustrated by FIG. 2, to removably secure the fairing sections together in this position.

It becomes evident from a comparison of FIGS. 2 and 3 of the drawing that the upper fairing portion 40 is selectively movable relative to the lower base portion 38 between an operational position in which the fairing 36 is at maximum elevation (FIG. 3), and a lower minimum elevation non-operational position forward of the lower base portion 38 (FIG. 3). The upper fairing portion 40 may be removably secured to the lower base fairing portion 38 in both the operational and non-operational positions by conventional means previously discussed.

Figure 5:
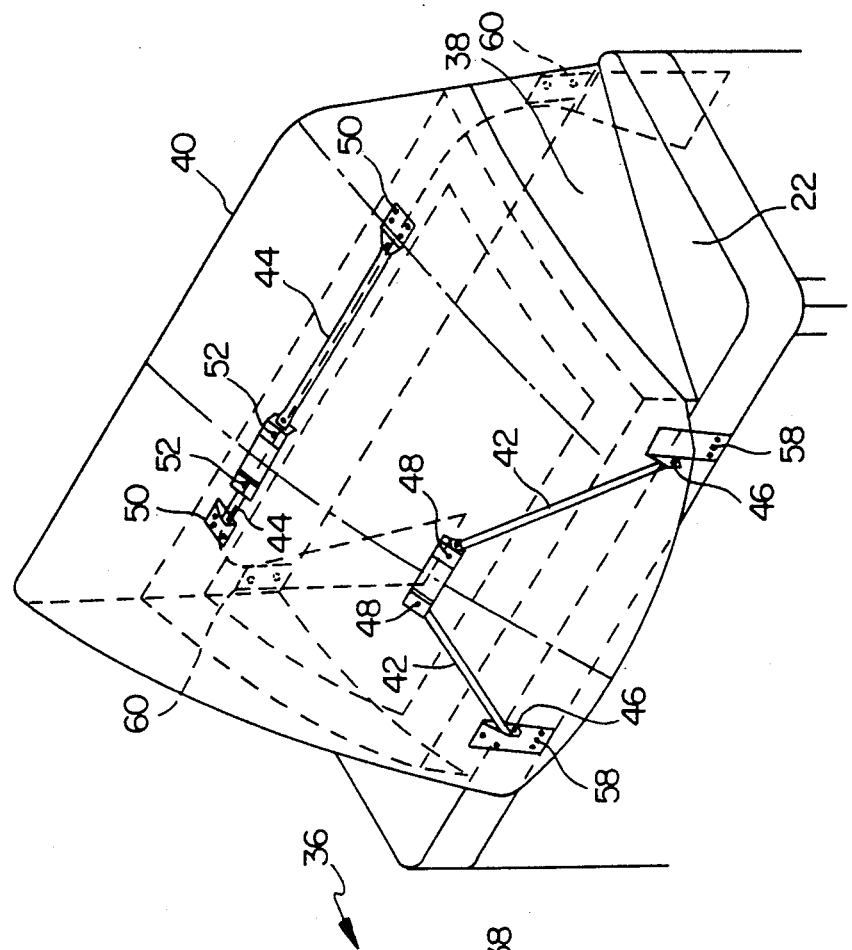
FIG. 5 of the drawing illustrates, in perspective, a two-piece roof fairing in accordance with the present invention in which the fixed lower base fairing portion is mounted to the roof of an existing standard height sleeper compartment of a truck.
Figure 4:
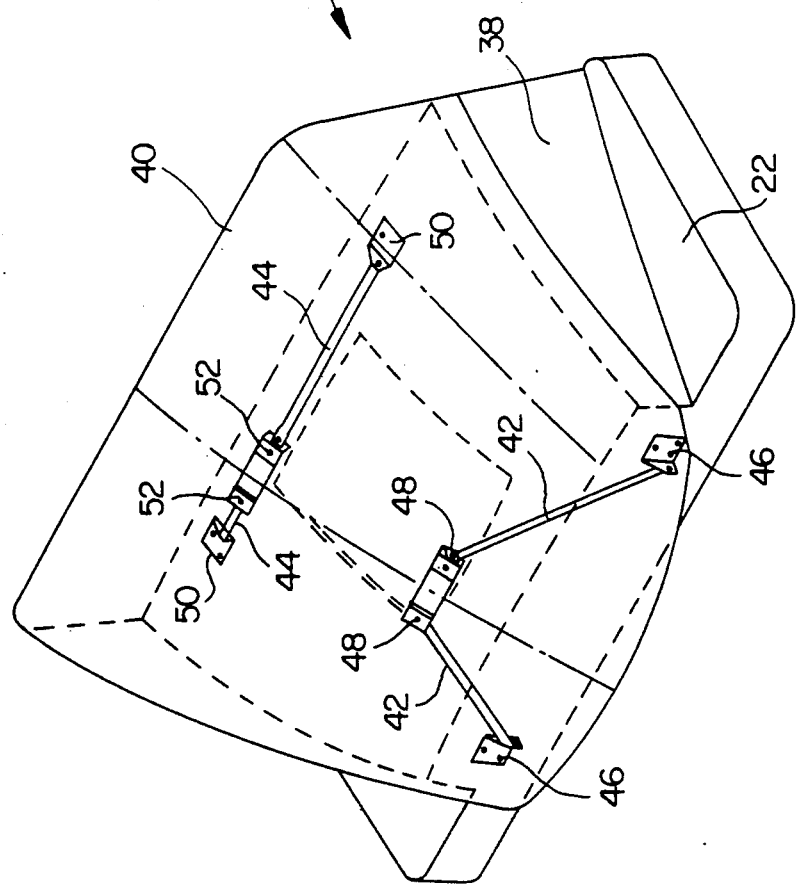
FIG. 4 of the drawing illustrates, in perspective, a two-piece roof fairing in accordance with the present invention in its elevated operational position in which the fixed lower base fairing portion is integrally formed with the roof of a sleeper compartment of a truck.

FIGS. 4 and 5 of the drawing illustrate perspective views of the fairing of FIG. 3 of the drawing in its elevated operational position. FIG. 4 shows the base portion 38 of the fairing 36 integrally formed as the roof of a sleeper compartment of a truck, such as the sleeper compartment 22 illustrated in FIG. 1. The lower base fairing portion 38 has a closed top surface, but it is otherwise hollow, and therefore can effectively function as the roof of the sleeper compartment to increase the height of the sleeper compartment to enhance the convenience and comfort of the occupant.

FIG. 5 of the drawing illustrates the lower base fairing portion 38 mounted to the roof of an existing sleeper compartment 22. Means for mounting, such as an L-shaped bracket or a tab extending from the bottom of the base 38 and having openings to match corresponding openings provided on the roof of the sleeper cab to receive mounting bolts, can be employed to mount the base 38 to the roof of the sleeper compartment. Front mounting plates 58, and rear mounting plates 60, can also be used to fixedly secure the lower base fairing portion 38 to the roof of the existing sleeper compartment 22. The mounting plates 58 and 60 may also be used as anchors for supporting the front and rear pivot elements 46 and 50, respectively, connected to the ends of the forward and rear pivotable struts 42 and 44 which are pivotably mounted to the lower base fairing portion 38.

Still referring to FIGS. 4 and 5 of the drawings, it is apparent that the forward end of the fairing 36 is narrower in width than the rear end of the fairing, and that the fairing increases in width in a longitudinal direction from front to rear for both the lower and upper fairing sections 38 and 40. Accordingly, when the movable upper fairing section 40 is advanced forwardly and downwardly relative to the lower base fairing section 38, as illustrated in FIG. 2 of the drawing, the wider rear portion of the upper fairing section is accommodated around and supported on the narrower forward portion of the lower base fairing section. It therefore is unnecessary to even temporarily deform the configuration of either the upper or lower fairing sections to enable the upper section to be seated around the fixed lower section when the upper section is advanced forwardly into its non-operational retracted position relative to the lower fixed base fairing section.

Both the upper movable fairing section 38 and the fixed lower base fairing section 40 have closed upper surfaces. Accordingly, the overall fairing 36 has a closed top surface both when the movable upper fairing section is selectively moved atop the fixed base fairing section in the elevated operational fairing position, and also when the upper fairing section is selectively moved forwardly and downwardly relative to the fixed base fairing section into the retracted non-operational fairing position. The fixed base fairing section and the movable upper fairing section are preferably formed from lightweight fiberglass or other known suitable materials, by injection molding or other known manufacturing procedures.

As discussed above, when the fairing 36 of the present invention is used on a truck having a separate sleeper compartment, the lower base fairing portion is preferably mounted (or formed integrally with) the roof of the sleeper compartment. In the elevated operational position of the fairing, both the upper and lower fairing portions will be substantially above the roof of the sleeper compartment. When the upper fairing portion is pivoted forwardly into its retracted non-operational position, it will be substantially supported by the roof of the cab which is positioned forwardly of the sleeper compartment. The fairing may also be used on trucks in which the base portion forms the roof of a sleeper section of a truck having a common space for both the cab section and a sleeper section. However, the fixed lower base fairing portion may also be directly mounted to the roof of the cab portion of the truck, as for example, when the truck is not carrying a sleeper compartment or does not have a common sleeper section. In this embodiment, the lower base and upper fairing portions will both be substantially above the roof of the cab when the fairing is in its elevated operational position, and the upper fairing portion will extend forwardly and overhang from the front end of the cab when the fairing is in its forwardly oriented non-operational position.

The fairing 36 described herein may also be used in conjunction with a horizontal release angle trim tab (either adjustable or non-adjustable) provided at the rear end of the upper surface of the top fairing section, and may also be provided with adjustable side trim tabs (either adjustable or non-adjustable) mounted to the rear portions of the sidewalls of the lower base and upper fairing portions. Horizontal adjustable release angle trim tabs, and vertical adjustable side trim tabs, as used in conjunction with a drag reducing fairing for trucks, are more fully discussed in U.S. Pat. Nos. 4,919,472, 4,784,424 and 4,245,862, to which further reference may be made. The disclosures of these patents are expressly incorporated by reference herein.

FIG. 6 is similar to FIG. 3 of the drawing and illustrates a side elevational view of the fairing 36 of the present invention mounted directly atop of roof 62 of a cab 64 of a vehicle. The same reference numerals have been designated in FIG. 6 for corresponding elements in the previously discussed drawings. The structure and operation of the fairing disclosed by FIG. 6 is the same as that of the embodiments of the invention previously described herein.

Other modifications and variations within the scope of the invention described herein will become apparent to those skilled in the art. Accordingly, the above description of the preferred embodiments of the invention are intended to be illustrative only, and not restrictive of the scope of the invention, that scope being defined by the following claims and all equivalents thereto.

We claim:

1. A roof fairing for reducing drag on a motor vehicle, said fairing comprising at least first and second air deflection components:

said first component comprising a lower base section having opposed sidewalls and a top surface spanning said opposed sidewalls, said sidewalls and said top surface being fixedly positioned relative to each other, and means for fixedly positioning said lower base section relative to a roof portion of a vehicle, said second component comprising an upper section and means for movably mounting said upper section relative to said fixed lower base section for substantially longitudinal movement relative to said fixed base section along a longitudinal direction of extension of said roof portion of said vehicle between a first position in which said upper section is mounted substantially atop said fixed lower base section and a second position in which said upper section is longitudinally offset relative to said fixed lower base section.

2. The roof fairing as claimed in claim 1 wherein said fixed lower base section has a front end and a rear end, and said upper section being movably mounted relative to said fixed lower base section such that said second position of said upper section is in a direction towards the front end of said fixed lower base section.

3. The roof fairing as claimed in claim 1 wherein said upper section has a front end and a rear end, and a closed top surface extending from said front end to said rear end.

4. The roof fairing as claimed in claim 1 wherein said fixed lower base section defines a front end and a rear end, and said top surface spanning said opposed sidewalls extends from said front end to said rear end of said lower base section to define a closed top surface thereon.

5. The roof fairing as claimed in claim 1 wherein said upper section has a front end and a rear end, said front end of said upper section being lesser in width than said rear end of said upper section, said upper section increasing in width in a direction from said front end section thereof to said rear end section thereof.

6. The roof fairing as claimed in claim 1 wherein said fixed lower base section has a front end and a rear end, said front end of said lower base section being lesser in width than said rear end of said lower base section, said fixed lower base section increasing in width in a direction from said front end thereof to said rear end thereof.

7. The roof fairing as claimed in claim 1 wherein said upper fairing section includes an upper fairing front end and an upper fairing rear end, and a closed top surface extending from said upper fairing front end to said upper fairing rear end;

said lower base section includes a lower base front end and a lower base rear end, and a closed top surface extending between said lower base front end and said lower base rear end;

said lower base front end being lesser in width than said lower base rear end, and said upper fairing front end being lesser in width than said upper fairing rear end;

and means for moving said upper fairing section into said second position such that said upper fairing section is longitudinally offset forwardly relative to said fixed lower base section and a portion of said wider rear end of said upper fairing section is positioned over the narrower front end of said fixed lower base section.

8. The fairing as claimed in claim 7 wherein said means for moving said upper section into said second position further results in downward movement of said upper section relative to said base section.

9. The fairing as claimed in claim 1 wherein said means for movably mounting includes at least one strut pivotably mounted at one end to said upper fairing section and pivotably mounted at its other end to said fixed base section.

10. The fairing as claimed in claim 9 wherein said at least one strut includes a front strut and a rear strut, said front strut being pivotably mounted to front portions of said upper and lower fairing sections, respectively, and said rear strut being pivotably mounted to rear portions of said upper and lower base fairing sections respectively.

11. The fairing as claimed in claim 1 wherein said means for fixedly positioning said lower base section relative to a roof portion of said vehicle includes means for mounting said fixed lower base fairing section to the roof of a cab of a vehicle.

12. The fairing as claimed in claim 1 wherein said means for mounting said fixed lower base fairing section to the roof of a cab of a vehicle includes means for mounting said fixed lower base fairing section to the roof of a sleeper area or compartment behind the cab of a vehicle.

13. The fairing as claimed in claim 1 wherein said fixed lower base fairing section is defined by the roof of a sleeper compartment of a vehicle.

14. A roof fairing for reducing drag on a vehicle, said fairing comprising at least first and second air deflection components:

said first component comprising a lower base section having opposed sidewalls and a top surface spanning across said opposed sidewalls, said opposed sidewalls and said top surface being fixedly positioned relative to each other, and means for fixedly positioning said lower base section relative to a roof portion of a vehicle, said second component comprising an upper section and means for movably mounting said upper section relative to said fixed lower base section, said upper section having a front end portion, a rear end portion, and a closed top surface extending from said upper section front end portion to said upper section rear end portion;

said lower base section having a front end portion and a rear end portion, said lower base section top surface spanning said opposed sidewalls and extending from said lower base front end portion to said lower base rear end portion to define a closed top surface of said lower base section;

said upper section rear end portion being wider than said upper section front end portion, and said lower base rear end portion being wider than said lower base front end portion; and means for movably mounting said upper section forwardly relative to said fixed lower base section such that a portion of said wider rear end of said upper section is positioned over a portion of said narrower front end of said fixed base section.

15. The fairing as claimed in claim 14 wherein said means for movably mounting said upper section relative to said fixed lower base section includes means for moving said upper section rearwardly and upwardly relative to said fixed lower base section such that said upper section is positioned substantially atop said fixed base, and said wider rear end of said fixed lower base section is substantially in alignment with said wider rear end of said upper section to form a continuous rear end of said fairing.

16. The fairing as claimed in claim 14 wherein said means for movably mounting said upper section relative to said fixed lower base section includes at least one strut having two ends, one end of said strut pivotably mounted to said upper section, and the other end of said strut being pivotably mounted to said fixed lower base section.

17. A roof fairing for reducing drag on a vehicle, said fairing including first and second air deflection components:

said first component including a lower base fairing section having opposed sidewalls and a top surface spanning said opposed sidewalls, said opposed sidewalls and said top surface being fixedly positioned relative to each other, and means for fixedly positioning said lower base section relative to a roof portion of a vehicle, said second component comprising an upper fairing section oriented substantially atop said lower base section in a first operational position, and oriented forwardly relative to said lower base section in a second non-operational position, and means for movably mounting said upper fairing section relative to said lower base fairing section for movement between said first operational position and said second non-operational position.

18. The roof fairing as claimed in claim 17 wherein said upper section includes a wider rear portion and a narrower forward portion, said lower section includes a wider rear portion and a narrower forward portion, said wider rear portion of said upper section being positioned over said narrower forward portion of said fixed base section when said upper section is in said second non-operational position.

19. The fairing as claimed in claim 18 wherein said wider rear portion of said fixed base is substantially in alignment with said wider rear portion of said upper section when said upper section is positioned substantially atop said fixed base section in said first operational position.

20. The fairing as claimed in claim 17 wherein said fixed lower fairing section includes a front and rear end, and said upper fairing section includes a front and rear end, the distance between said front end and said rear end of said upper section being greater than the distance between the front end the rear end of said lower base section, wherein said front end of said upper section extends beyond said front end of said lower base section when said upper section is mounted atop said lower base section and said rear end of said lower base section is in alignment with said rear end of said upper section.

* * * * *